United States Patent
Mothe et al.

(10) Patent No.: US 10,974,845 B2
(45) Date of Patent: Apr. 13, 2021

(54) FLUID RESERVOIRS FOR VEHICLES

(71) Applicant: Rosemount Aerospace Inc., Burnsville, MN (US)

(72) Inventors: Venkata Anil Kumar Mothe, Karnataka (IN); Jai Kumar Gowda, Karnataka (IN); Stephen D. Rock, Apple Valley, MN (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 66 days.

(21) Appl. No.: 16/399,236

(22) Filed: Apr. 30, 2019

(65) Prior Publication Data
US 2020/0189762 A1   Jun. 18, 2020

(30) Foreign Application Priority Data
Dec. 13, 2018  (IN) .............................. 201811047214

(51) Int. Cl.
*B64D 45/00* (2006.01)
*B64C 1/14* (2006.01)

(52) U.S. Cl.
CPC .............. *B64D 45/00* (2013.01); *B64C 1/14* (2013.01); *B64D 2045/0085* (2013.01)

(58) Field of Classification Search
CPC . B65D 90/52; B65D 90/48; Y10T 137/86212; Y10T 137/8622; B64D 45/00; B64D 2045/0085; B64C 1/14
USPC ....................................................... 220/563
See application file for complete search history.

(56) References Cited

U.S. PATENT DOCUMENTS

| 4,514,980 A * | 5/1985 | Ishiwata ............... B60T 17/225 60/534 |
|---|---|---|
| 7,445,165 B2 * | 11/2008 | Franco .................... B60S 1/482 239/284.1 |
| 2015/0360661 A1 | 12/2015 | Dumas et al. |
| 2017/0305392 A1 | 10/2017 | Lee |

FOREIGN PATENT DOCUMENTS

| CN | 207163539 U | 3/2018 |
|---|---|---|
| DE | 10015594 A1 | 10/2001 |
| FR | 2753669 A1 | 3/1998 |
| FR | 2966110 A1 | 4/2012 |
| JP | H07156757 A | 6/1995 |
| JP | 2010012943 A | 1/2010 |

OTHER PUBLICATIONS

Extended Search Report; Application No. 19214783.3; dated Apr. 23, 2020; 7 pages.

* cited by examiner

*Primary Examiner* — Reinaldo Sanchez-Medina
*Assistant Examiner* — Nicole Gardner
(74) *Attorney, Agent, or Firm* — Cantor Colburn LLP

(57) ABSTRACT

A fluid reservoir for a vehicle includes a reservoir body with a sensing chamber portion, a neck portion, and a reserve chamber portion. The neck portion is connected to the sensing chamber portion and the reserve chamber portion is connected to the sensing chamber portion by the neck portion. The neck portion defines a neck portion volume that is smaller a volume defined by the sensing chamber to limit slosh in the sensing chamber when a reserve volume of fluid is present within the fluid reservoir. Windscreen washing systems and aircraft having fluid reservoirs are also described.

15 Claims, 5 Drawing Sheets

FLUID RESERVOIRS FOR VEHICLES

CROSS REFERENCE TO RELATED APPLICATIONS

This application claims the benefit of Indian Application No. 201811047214, filed Dec. 13, 2018, the contents of which is incorporated by reference herein in its entirety.

BACKGROUND

The present disclosure relates to fluid reservoirs, and more particularly to fluid reservoirs for windscreen washing systems such as windscreen washing systems carried on aircraft.

Vehicles, such as aircraft, commonly include windshield washing systems. Such systems generally include one or more wipers arranged to mechanically wipe the vehicle windshield to maintain an acceptable level of visibility through the windshield, typically by sweeping away precipitation and/or dirt and dust from the windshield surface. The windshield wipers commonly cooperate with a windshield wiper fluid system, which issues fluid to the windshield to assist in the removal of material from the windshield, limit wear of the wiper blades, and prevent damage of the windshield by material swept across the windshield surface by the wiper. A supply of windshield wiper fluid is typically carried by the vehicle for use during operation, the supply replenished when necessary. In some vehicles a sensing device is employed to signal the need to replenish the windshield wiper fluid.

One challenge is that the motion of the vehicle can sometimes cause the sensing device to provide a false indication of the status of the windshield wiper fluid supply carried by the vehicle. For example, shocks imparted to the supply can the sensing device to intermittently change the status reported by the sensing device due to sloshing of the fluid in response to the shocks. Tilting of the fluid supply, such as from driving on an inclined surface or by change in the attitude of the vehicle can also cause the sensing device to provide false indication of the level within the tank containing the fluid. Such false indications can trigger unnecessary service events, reducing the availability of the vehicle. Such false indications can also make more likely dry events, which can reduce the reliability of the windshield wiping system. And in vehicles equipped with prognostic monitoring systems, such false indications of level within the fluid tank can cause errors in the calculated predicted time interval between low-level indication and the onset of dry runs of the wiper blades.

Such systems and methods have generally been considered suitable for their intended purpose. However, there remains a need for improved fluid reservoirs, windscreen washing systems, and aircraft having fluid reservoirs that are tolerant of the tilts experienced during flight. The present disclosure provides a solution to this need.

BRIEF SUMMARY

A fluid reservoir for a vehicle is provided. The fluid reservoir includes a reservoir body with a sensing chamber portion, a neck portion connected to the sensing chamber portion, and a reserve chamber portion. The reserve chamber portion is connected to the sensing chamber to the sensing chamber portion by the neck portion and the neck portion defines a neck portion volume that is smaller a volume defined by the sensing chamber to limit slosh in the sensing chamber when a reserve volume of fluid is present within the fluid reservoir.

In addition to the one or more features described above, or as an alternative, further embodiments may include that a volume defined by the reserve chamber is larger than the volume defined by the sensing chamber portion.

In addition to the one or more features described above, or as an alternative, further embodiments may include that the reservoir body further comprises a footer portion connecting the neck portion to the reserve chamber portion.

In addition to the one or more features described above, or as an alternative, further embodiments may include that the reservoir body further comprises a baffle portion located between the sensing chamber portion and the reserve chamber portion, the baffle portion adjacent to the neck portion.

In addition to the one or more features described above, or as an alternative, further embodiments may include that the reservoir body further comprises a supply chamber portion connected to the neck portion.

In addition to the one or more features described above, or as an alternative, further embodiments may include that the supply chamber portion defines a fill aperture arranged to receive a removable fill cap for charging the fluid reservoir.

In addition to the one or more features described above, or as an alternative, further embodiments may include that the supply chamber portion defines a supply chamber volume that is greater than the volume defined by the reserve chamber portion.

In addition to the one or more features described above, or as an alternative, further embodiments may include that the reservoir body further comprises a header portion connecting the sensing chamber portion to the supply chamber portion.

In addition to the one or more features described above, or as an alternative, further embodiments may include that the reservoir body further comprises a baffle portion located on a side of the sensing chamber opposite the reserve chamber portion.

In addition to the one or more features described above, or as an alternative, further embodiments may include that the neck portion is first neck portion and wherein the reservoir body further comprises a second neck portion, the second neck portion located on as side of the sensing chamber portion opposite the first neck portion.

In addition to the one or more features described above, or as an alternative, further embodiments may include that second neck portion has a volume that is smaller than the volume defined by the sensing chamber portion.

In addition to the one or more features described above, or as an alternative, further embodiments may include that the sensing chamber and the reserve chamber are arranged along a fill axis, wherein the first neck portion and the second neck portion are located on opposite sides of the fill axis.

In addition to the one or more features described above, or as an alternative, further embodiments may include a sensor positioned on the sensing chamber portion and configured to report presence of a liquid surface within the sensing chamber.

In addition to the one or more features described above, or as an alternative, further embodiments may include that the sensing chamber and the reserve chamber are arranged along a fill axis, wherein a supply-side baffle of the sensing chamber portion and a reserve-side baffle of the sensing chamber are each oblique relative to the fill axis.

In addition to the one or more features described above, or as an alternative, further embodiments may include that the supply-side baffle of the sensing chamber portion and the reserve-side baffle of the sensing chamber portion are substantially parallel with one another.

In addition to the one or more features described above, or as an alternative, further embodiments may include a windscreen wash fluid at least partially occupying the reserve chamber portion of the fluid reservoir.

A windscreen washing system is also provided. The windscreen washing system includes a fluid reservoir as described above. The reservoir body includes a baffle portion located between the sensing chamber portion and the reserve chamber portion, the baffle portion adjacent to the neck portion. A pump is in communication with reserve chamber portion of the fluid reservoir, a windscreen wash fluid at least partially occupying the reserve chamber portion of the fluid reservoir, and a sensor positioned on the sensing chamber portion and configured to report presence of a liquid surface within the sensing chamber.

An aircraft is also provided. The aircraft includes a fluid reservoir as described above. The sensing chamber portion and the reserve chamber portion are arranged along a fill axis and the fill axis disposed vertically relative to gravity when the aircraft is in normal, level flight. A windscreen wash fluid at least partially occupies the reserve chamber portion of the fluid reservoir and a sensor is positioned on the sensing chamber portion and configured to report presence of a liquid surface within the sensing chamber, sensing chamber arranged such that the sensor indicates low-level within a predetermined range of aircraft pitch and a predetermined range aircraft roll.

In addition to the one or more features described above, or as an alternative, further embodiments may include that wherein the predetermined range of aircraft pitch corresponds to a tilt of the fill axis within a range +/−45 degrees relative to gravity.

In addition to the one or more features described above, or as an alternative, further embodiments may include that wherein the predetermined range of aircraft roll corresponds to a tilt of the fill axis within a range +/−45 degrees relative to gravity.

Technical effects of embodiments of the present disclosure include the capability accurately detect liquid level within fluid reservoir when the fluid reservoir is subjected to tilting and/or shocks. In certain embodiments the likelihood a wiper dry runs in windshield wiping systems is reduced due to the reduction (or elimination) of erroneous signal associated with tilt and/or shocks driving transient fluid through the sensing area of the sensor associated with the fluid reservoir.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 1:
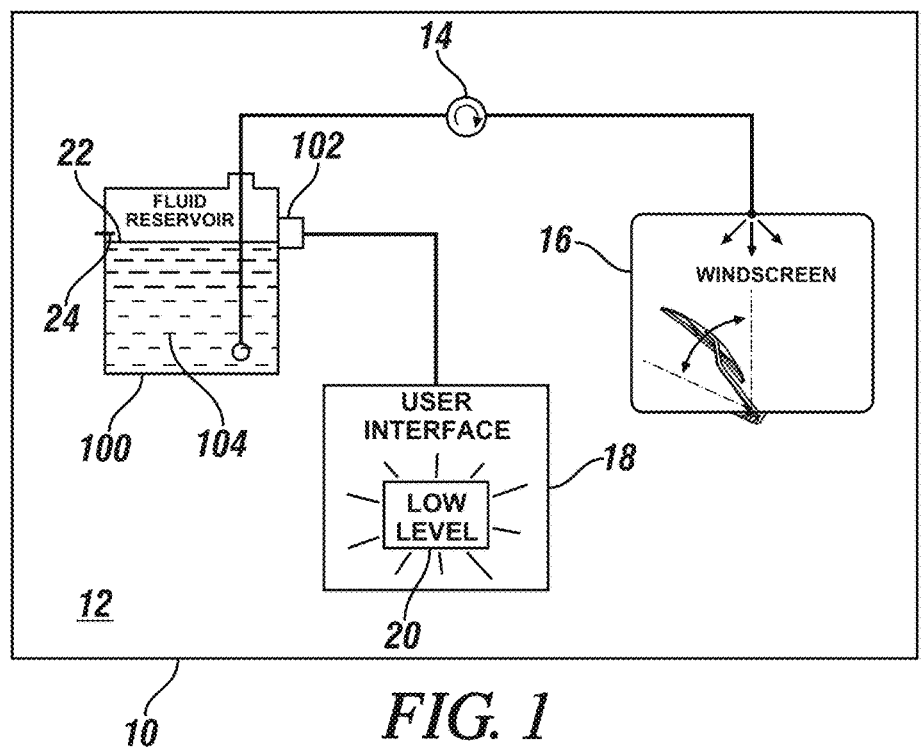
FIG. 1 is a schematic view of a windscreen washing system for an aircraft, schematically showing the winding washing system providing indication that a low-level of fluid is present in a fluid reservoir using a sensor positioned on the fluid reservoir and in communication with a user interface.
Figure 5:
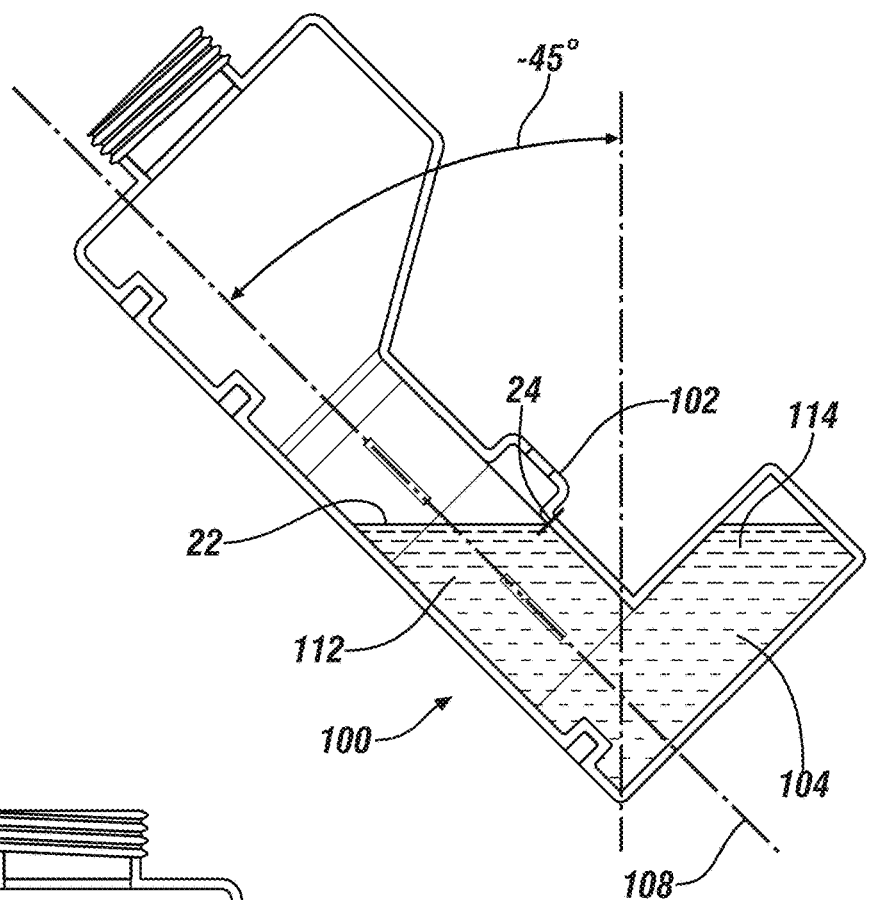
Figure 6:
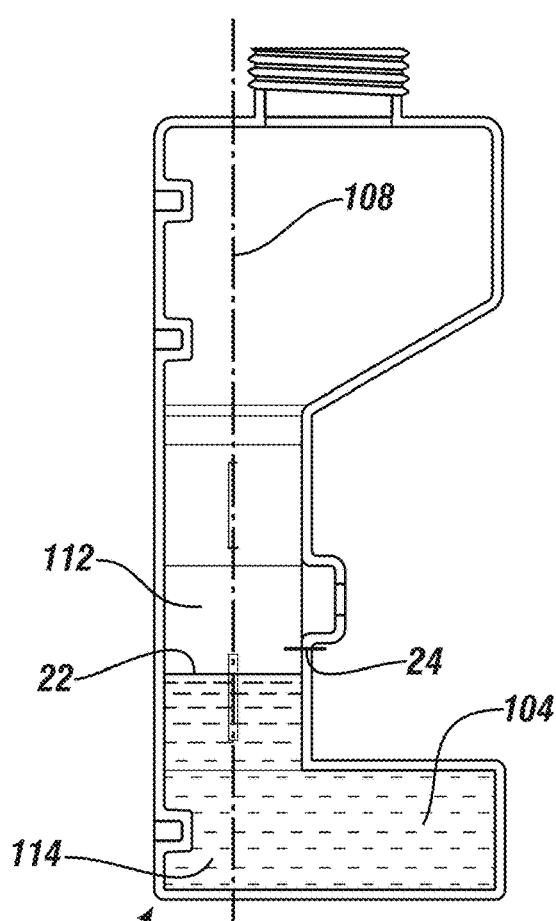
Figure 7:
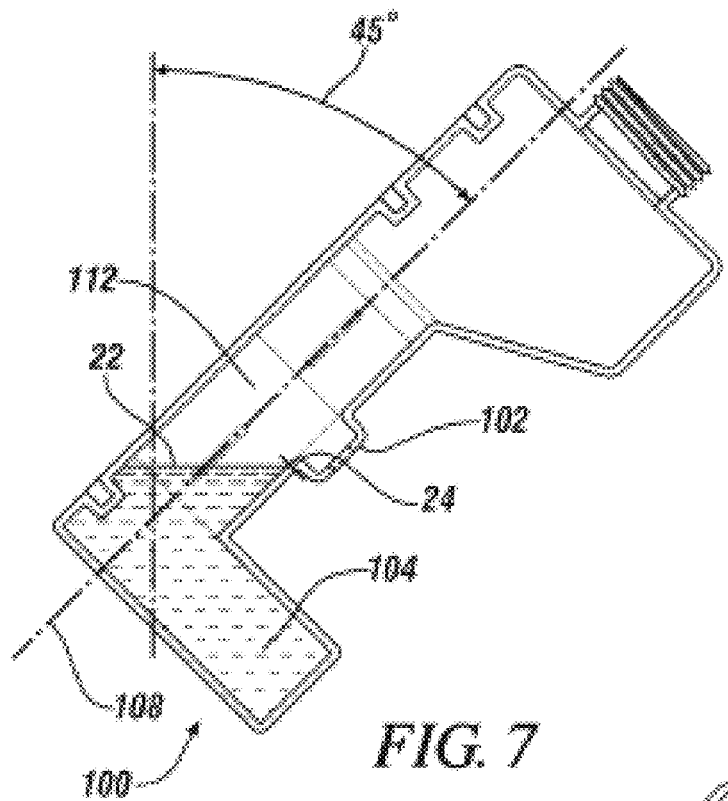
Figure 8:
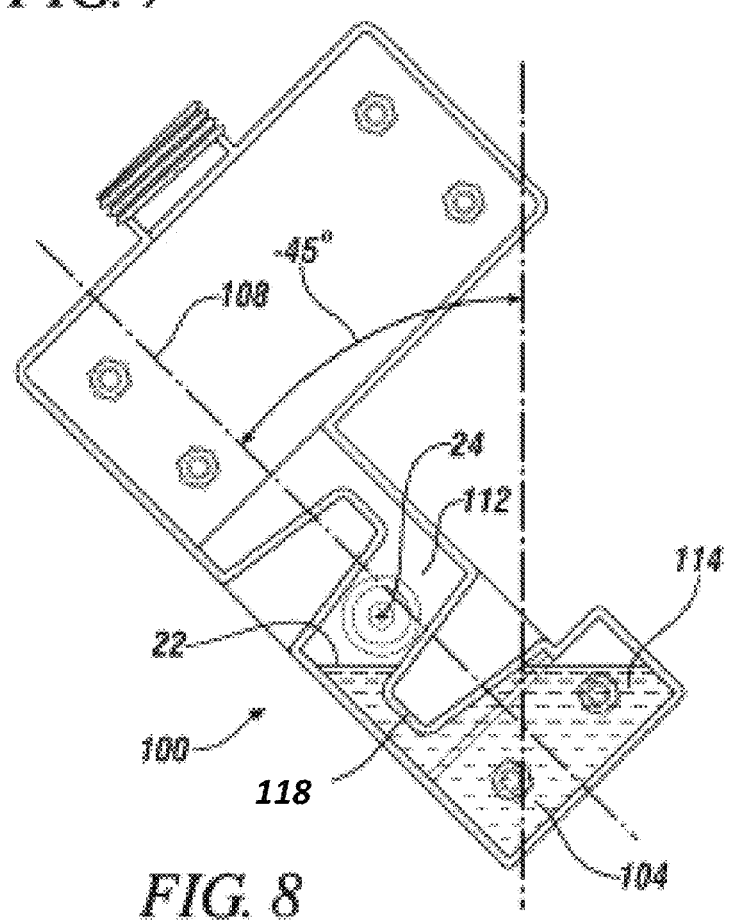
Figure 9:
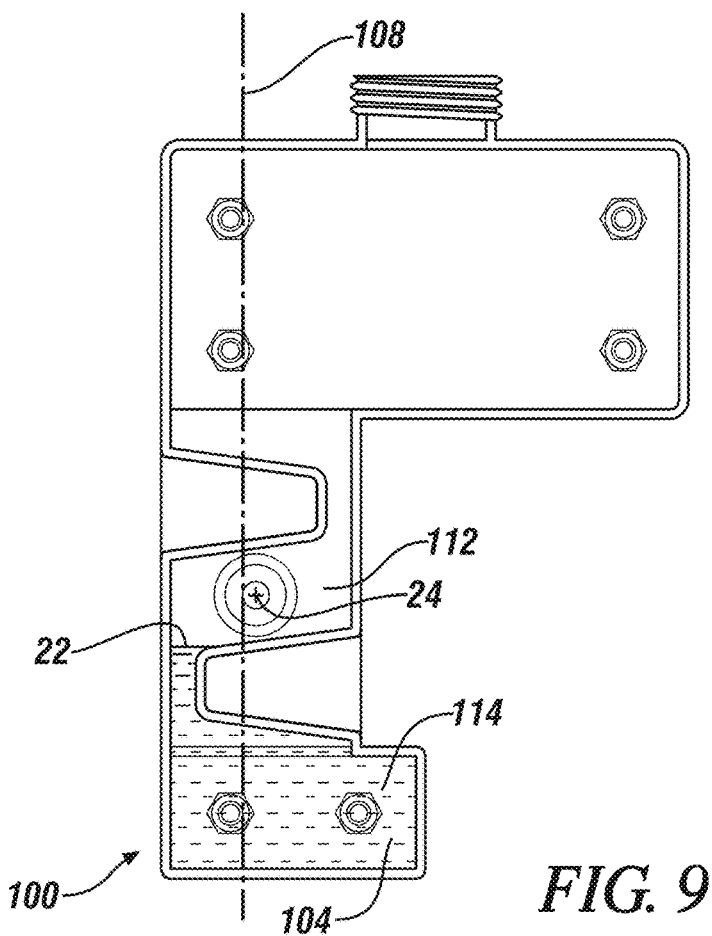
Figure 10:
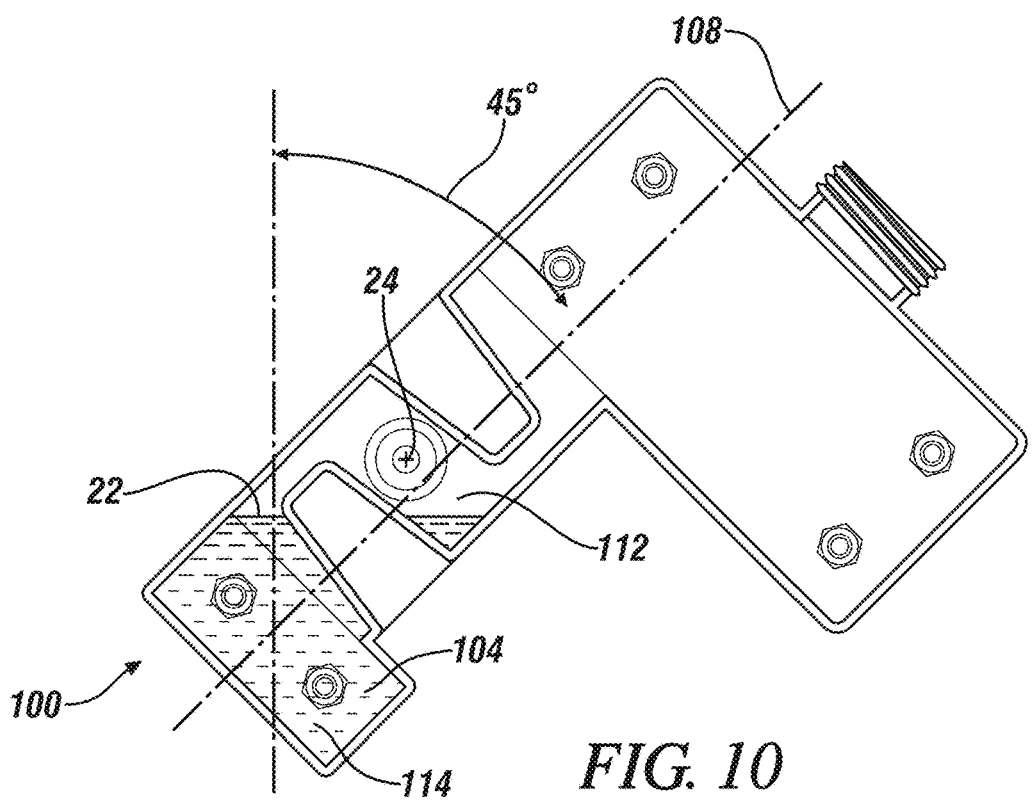

FIGS. 5-7 are side elevation views of the fluid reservoir illustrated in FIG. 1, showing the sensor providing indication of low-level when fluid level within the fluid reservoir below a predetermined level through an exemplary range of tilts relative to gravity; and FIGS. 8-10 are side elevation views of the fluid reservoir illustrated in FIG. 1, showing the sensor providing indication of low-level when fluid level within the fluid reservoir below a predetermined level through another exemplary range of tilts relative to gravity.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a fluid reservoir in accordance with the disclosure is shown in FIG. 1 and is designated generally by reference character 100. Other embodiments of fluid reservoirs, windscreen washing systems, and aircraft having windscreen washing systems with fluid reservoirs in accordance with the present disclosure, or aspects thereof, are provided in FIGS. 2-10, as will be described. The systems and methods described herein can be used providing low-level indication of fluid contained in fluid reservoirs prior to the reservoir being emptied, such as in low-level fluid sensor windscreen washing systems for aircraft, though the present disclosure is not limited to windscreen washing systems or to aircraft in general.

Referring to FIG. 1, an aircraft 10 is shown. Aircraft 10 includes a windscreen washing system 12. Windscreen washing system 12 includes the fluid reservoir 100, a sensor 102, a pump 14, windscreen 16, and user interface 18. The fluid reservoir 100 is occupied at least partially with a windscreen wash fluid 104. The pump 14 is in fluid communication with the fluid reservoir 100 to draw the windscreen wash fluid 104 from the fluid reservoir 100 and provide same to the windscreen 16, where wipers or other mechanical devices wipe the windscreen 16 and the windscreen wash fluid 104 to maintain visibility through the windscreen 16.

The sensor 102, e.g., a liquid level sensor, is positioned on the fluid reservoir 100 and is arranged to provide a low-level indication 20 when the level 22 of fluid within the fluid reservoir 100 is below a predetermined level 24. In this respect the sensor 102 can be disposed in communication with the user interface 18, which can be located on the flight deck of the aircraft 10 by way of non-limiting example. In certain embodiments the sensor 102 is disposed in communication with a prognostic health management system to schedule maintenance event, such as replenishment of the fluid reservoir 100, using data provided by the sensor 102. It is contemplated that the sensor 102 can include one or more of an optical sensor, an acoustic sensor, and/or an electromagnetic sensor arranged for outputting a signal indicative of location of surface of a liquid within the fluid reservoir 100, as suitable for an intended application.

As will be appreciated by those of skill in the art in view of the present disclosure, aircraft such the aircraft 10 can be subject to various types of movements and forces during flight, e.g., pitch, roll, etc. As will also be appreciated by those of skill in the art in view of the present disclosure, movements and forces experienced during flight can displace the windscreen wash fluid 104 located within the fluid reservoir 100, sloshing and/or splashing the windscreen wash fluid 104 within the fluid reservoir 100. In some fluid reservoirs the sloshing and/or splashing of fluid within the reservoir can cause the sensor to provide either false indication of low-level, potentially resulting in an unnecessary servicing of the windscreen washing system, or fail to indicate low-level when the fluid level within the fluid reservoir requires replenishment potentially degrading the reliability of the windscreen washing system. To limit (or eliminated entirely) this tendency the fluid reservoir 100 is arranged to provide consistent level indication through a predetermined range of tilts.

Figure 2:
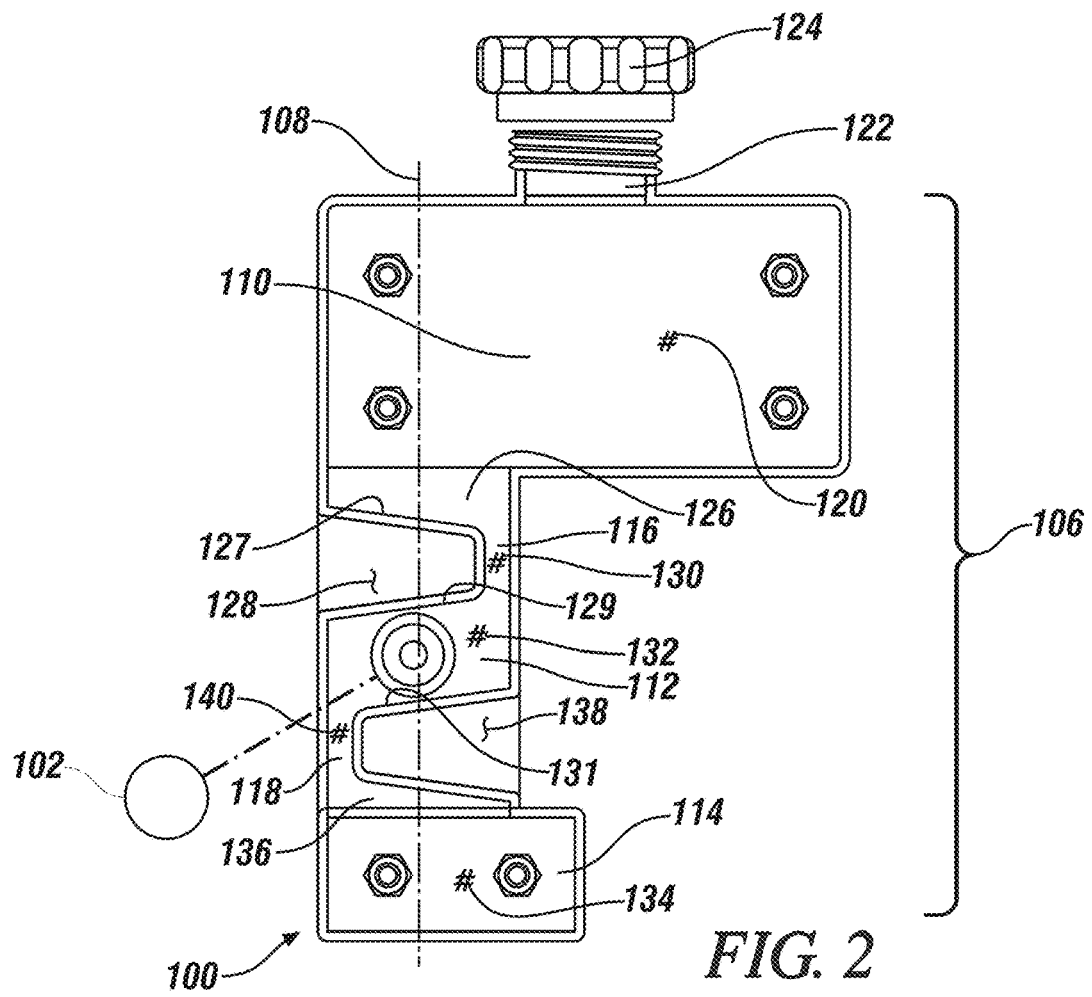
FIGS. 2-4 are side elevation and perspective views of the fluid reservoir illustrated in FIG. 1, showing a sensing chamber portion connected to a reserve chamber portion and a supply chamber portion by first and second neck portions of the fluid reservoir.
Figure 3:
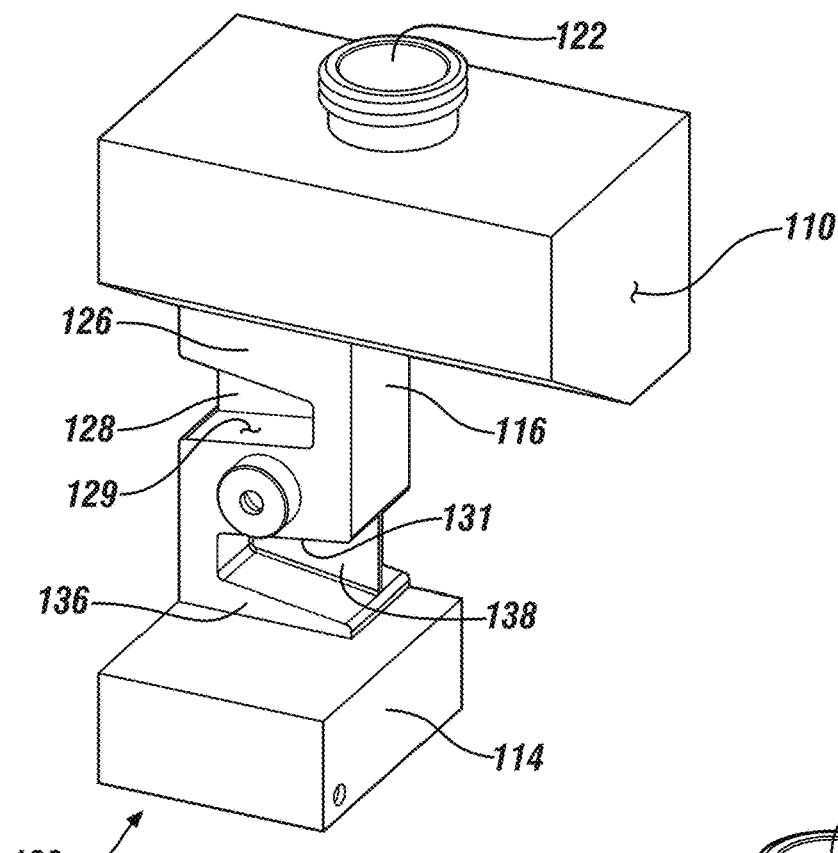
Figure 4:
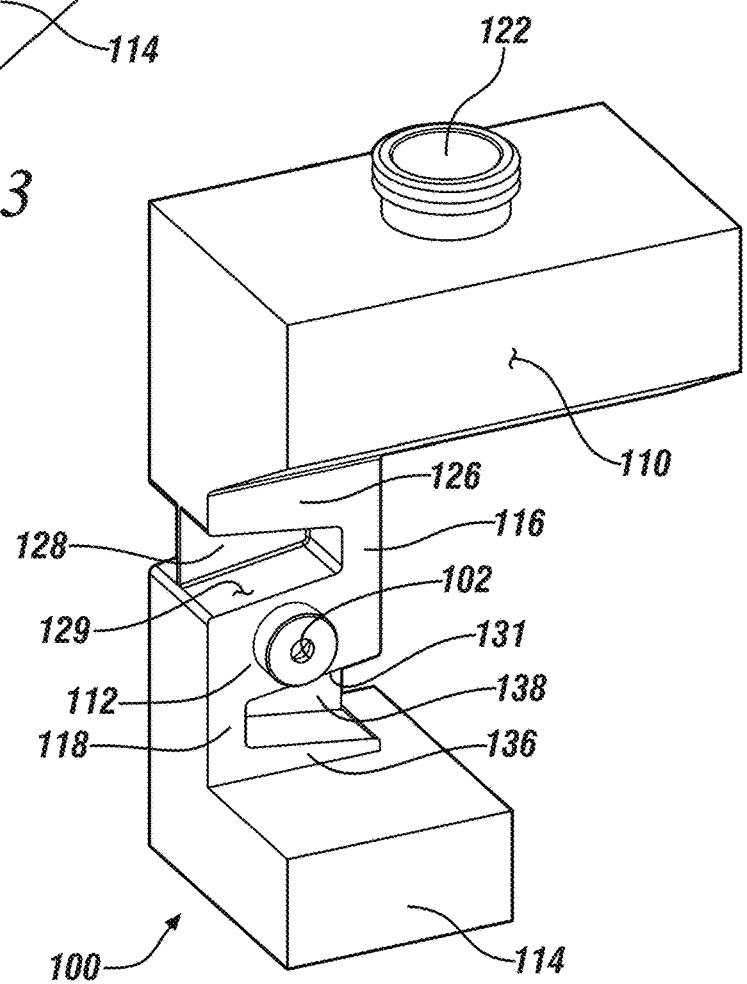

With reference to FIGS. 2-4, the fluid reservoir 100 is shown. The fluid reservoir 100 includes a reservoir body 106. The reservoir body 106 defines a fill axis 108 and has a supply chamber portion 110, a sensing chamber portion 112, a reserve chamber portion 114. The supply chamber portion 110, the sensing chamber portion 112, and the reserve chamber portion 114 are each arranged along the fill axis 108, the sensing chamber portion 112 being arranged axially between the supply chamber portion 110 and the reserve chamber portion 114. The reservoir body 106 also includes a first neck portion 116 and a second neck portion 118. The first neck portion 116 and the second neck portion 118 are arranged along the fill axis 108, the first neck portion 116 arranged axially between the supply chamber portion 110 and the sensing chamber portion 112, the second neck portion 118 arranged axially between the sensing chamber portion 112 and the reserve chamber portion 114.

The supply chamber portion 110 defines within its interior a supply chamber volume 120. A fill aperture 122 is in communication with the supply chamber volume 120 and is arranged to receive thereon a fill cap 124. In the illustrated embodiment the fill cap 124 is fixed to the reservoir body 106 by a threaded interface. The fill aperture 122 is in communication with the first neck portion 116 through the supply chamber portion 110 through a header portion 126, which is arranged axially between the supply chamber portion 110 and the first neck portion 116. A sloping supply-side baffle 127 bounds the header portion 126 and slopes toward the first neck portion 116.

The first neck portion 116 is arranged axially between the header portion 126 and the sensing chamber portion 112, is laterally offset from the fill axis 108, and fluidly connects the header portion 126 with the sensing chamber portion 112. It is contemplated that the first neck portion 116 be located adjacent to a first plate portion 128 connecting the supply-side baffle 127 of the header portion 126 to a supply-side baffle 129 of the sensing chamber portion 112. As will be appreciated by those of skill in the art in view of the present disclosure, the first plate portion 128 provides strength to the reservoir body 106. Volumetrically, the first neck portion 116 is relatively small, the first neck portion 116 defining a first neck portion volume 130 that is smaller than both the supply chamber volume 120 and a sensing chamber volume 132 defined by the sensing chamber portion 112.

The sensing chamber portion 112 is arranged axially between the first neck portion 116 and the second neck portion 118. In this respect the sensing chamber portion 112 fluidly connects the first neck portion 116 to the second neck portion 118, and therethrough to the reserve chamber portion 114. The sensing chamber portion 112 is bounded by the supply-side baffle 129 and a reserve-side baffle 131, each of which are angled relative to the fill axis 108. The sensing chamber volume 132 is larger than the first neck portion volume 130 and is smaller than both the supply chamber volume 120 and a reserve chamber volume 134 defined by the reserve chamber portion 114.

Both the supply-side baffle 129 and the reserve-side baffle 131 of the sensing chamber portion 112 are sloped. In this respect the supply-side baffle and the reserve-side baffle of the sensing chamber portion 112 slope in a direction downward (relative to gravity when aircraft 10 (shown in FIG. 1) is in normal, level flight) from the first neck portion 116 toward the second neck portion 118. The sensor 102 is positioned on a lateral wall of the sensing chamber portion 112 at a location axially between the supply-side baffle and the reserve-side baffle of the sensing chamber portion 112. In the illustrated embodiment the sensor 102 is arranged substantially midway along the length of the reserve-side baffle of the sensing chamber portion 112, the reserve-side baffle 131 and the supply-side baffle 129 of the sensing chamber portion 112 being oblique relative to the fill axis 108, the reserve-side baffle 131 being substantially parallel to the supply-side baffle 129 of the sensing chamber portion 112.

The second neck portion 118 is arranged axially between the sensing chamber portion 112 and the reserve chamber portion 114, is laterally offset from the fill axis 108 and on side of fill axis 108 opposite the first neck portion 116, and fluidly connects the sensing chamber portion 112 to the reserve chamber portion 114. The connection is through a footer portion 136, which is located axially between the second neck portion 118 and the reserve chamber portion 114. A second plate portion 138 is located axially between the footer portion 136 and the sensing chamber portion 112, the second plate portion 138 also providing structural strength to the reservoir body 106.

Volumetrically, the second neck portion 118 is also relatively small, the second neck portion 118 defining a second neck portion volume 140 that is also smaller than both the supply chamber volume 120 and a sensing chamber volume 132 defined by the sensing chamber portion 112. As shown herein the second neck portion volume 140 is substantially equivalent to the first neck portion volume 130. Notably, second neck portion 118 presents a relative narrow flow area to windscreen wash fluid 104 contained within reservoir body 106, limiting the effect sloshing by reducing the volume of the windscreen wash fluid 104 located within the sensing chamber portion 112.

The reserve chamber portion 114 is located along the fill axis 108 adjacent to the footer portion 136. It is contemplated that the reserve chamber volume 134 defined by the reserve chamber portion 114 be smaller than the supply chamber volume 120 and greater than the sensing chamber volume 132. Either or both the reserve chamber portion 114 and the supply chamber portion 110 can be provisioned for fixing the reservoir body 106 within the aircraft 10 (shown in FIG. 1), such as with fasteners, as suitable for an intended application.

As will be appreciated by those of skill in the art in view of the present disclosure, the sensing chamber portion 112 defines a confined volume with which the sensor 102 is in communication. Further, the confined volume defined by the sensing chamber portion 112 is accessible to windscreen wash fluid 104 (shown in FIG. 1) contained within the reserve chamber portion 134 through a tortious path extending through the footer portion 136 and the second neck portion 118. Moreover, the second neck portion 118 presents a relatively small flow area, which is relatively constrictive, to the windscreen wash fluid 104 when the tilting of the reservoir body 106 is such that the windscreen wash fluid 104 would otherwise be driven into the sensing chamber portion 112.

This effect is shown in FIGS. 5-7, wherein the reservoir body 106 is shown tilted at +45 degrees and −45 degrees relative vertical in first orientation, and in FIGS. 8-10, wherein the reservoir body 106 is shown tilted at +45 degrees and −45 degrees relative vertical in second orientation offset by 90 degrees about the fill axis 108. Notably, when the reservoir body 106 contains a volume of windscreen wash fluid substantially equivalent to the maximum amount where a low-level indication should be triggered, tilting of the fluid reservoir 106 does not displace fluid into the field of view of the sensor 102 sufficient to cause the sensor 102 to cease providing the low-level indication. Notably, enabling tilts on the order of +/−45 degrees provides reliable low-level indication in aircraft applications, such tilts corresponding to the tilts typically induced by normal aircraft manoeuvring.

The methods and systems of the present disclosure, as described above and shown in the drawings, provide improved fluid reservoirs that allow for accurate measurement of liquid level within the fluid reservoir. In certain embodiments the fluid reservoirs described herein a limit (or eliminate entirely) the tendency of sloshing to triggering intermittent changes in the low-level indication signal from the level sensor coupled to the fluid reservoir. In accordance with certain embodiments, the fluid reservoirs described herein can limit (or prevent entirely) dry runs of wiper blades in windscreen cleaning systems, improving reliability by improving expected service life of the wiper blade as well as the windscreen. In accordance with certain embodiments, the fluid reservoirs described herein make more reliable to the number of cycles that a fluid reservoir can support once a low-level indication is triggered. While the apparatus and methods of the subject disclosure have been shown and described with reference to preferred embodiments, those skilled in the art will readily appreciate that changes and/or modifications may be made thereto without departing from the spirit and scope of the subject disclosure. The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft, comprising:
a fluid reservoir for a vehicle, comprising:
a reservoir body, comprising:
a sensing chamber portion;
a neck portion connected to the sensing chamber portion; and
a reserve chamber portion connected to the sensing chamber portion by the neck portion, wherein the neck portion defines a neck portion volume that is smaller than a volume defined by the sensing chamber portion to limit slosh in the sensing chamber portion when a reserve volume of fluid is present within the fluid reservoir,
wherein the sensing chamber portion and the reserve chamber portion are arranged along a fill axis, the fill axis disposed vertically relative to gravity when the aircraft is in normal, level flight,
a windscreen wash fluid at least partially occupying the reserve chamber portion of the fluid reservoir; and
a sensor positioned on the sensing chamber portion and configured to report presence of a liquid surface within the sensing chamber portion, the sensing chamber portion arranged such that the sensor indicates low-level within a predetermined range of aircraft pitch and a predetermined range aircraft roll.

2. The aircraft as recited in claim 1, wherein a volume defined by the reserve chamber portion is larger than the volume defined by the sensing chamber portion.

3. The aircraft as recited in claim 1, wherein the reservoir body further comprises a footer portion connecting the neck portion to the reserve chamber portion.

4. The aircraft as recited in claim 1, wherein the reservoir body further comprises a baffle portion located between the sensing chamber portion and the reserve chamber portion, the baffle portion adjacent to the neck portion.

5. The aircraft as recited in claim 1, wherein the reservoir body further comprises a baffle portion located on a side of the sensing chamber portion opposite the reserve chamber portion.

6. The aircraft as recited in claim 1, wherein the neck portion is a first neck portion and wherein the reservoir body further comprises a second neck portion, the second neck portion located on a side of the sensing chamber portion opposite the first neck portion.

7. The aircraft as recited in claim 6, wherein the second neck portion has a volume that is smaller than the volume defined by the sensing chamber portion.

8. The aircraft as recited in claim 6, wherein the sensing chamber portion and the reserve chamber portion are arranged along a fill axis, wherein the first neck portion and the second neck portion are located on opposite sides of the fill axis.

9. The aircraft as recited in claim 1, further comprising a sensor positioned on the sensing chamber portion and configured to report presence of a liquid surface within the sensing chamber portion.

10. The aircraft as recited in claim 1, wherein the sensing chamber portion and the reserve chamber portion are arranged along a fill axis, wherein a supply-side baffle of the sensing chamber portion and a reserve-side baffle of the sensing chamber portion are each oblique relative to the fill axis.

11. The aircraft as recited in claim 10, wherein the supply-side baffle of the sensing chamber portion and the reserve-side baffle of the sensing chamber portion are substantially parallel with one another.

12. The aircraft as recited in claim 1, further comprising a windscreen wash fluid at least partially occupying the reserve chamber portion of the fluid reservoir.

13. The aircraft as recited in claim 1, comprising:
a windscreen washing system, comprising:
the fluid reservoir, wherein the reservoir body further comprises a baffle portion located between the sensing chamber portion and the reserve chamber portion, the baffle portion adjacent to the neck portion;
a pump in communication with the reserve chamber portion of the fluid reservoir;
a windscreen wash fluid at least partially occupying the reserve chamber portion of the fluid reservoir; and
a sensor positioned on the sensing chamber portion and configured to report presence of a liquid surface within the sensing chamber portion.

14. The aircraft as recited in claim 1, wherein the predetermined range of aircraft pitch corresponds to a tilt of the fill axis within a range +/−45 degrees relative to gravity.

15. The aircraft as recited in claim 1, wherein the predetermined range of aircraft roll corresponds to a tilt of the fill axis within a range +/−45 degrees relative to gravity.

* * * * *